Sept. 25, 1962
W. C. PIERCE
3,055,470
MAGNETIC CLUTCH WITH STATIONARY WINDING
Filed July 17, 1959
5 Sheets-Sheet 1
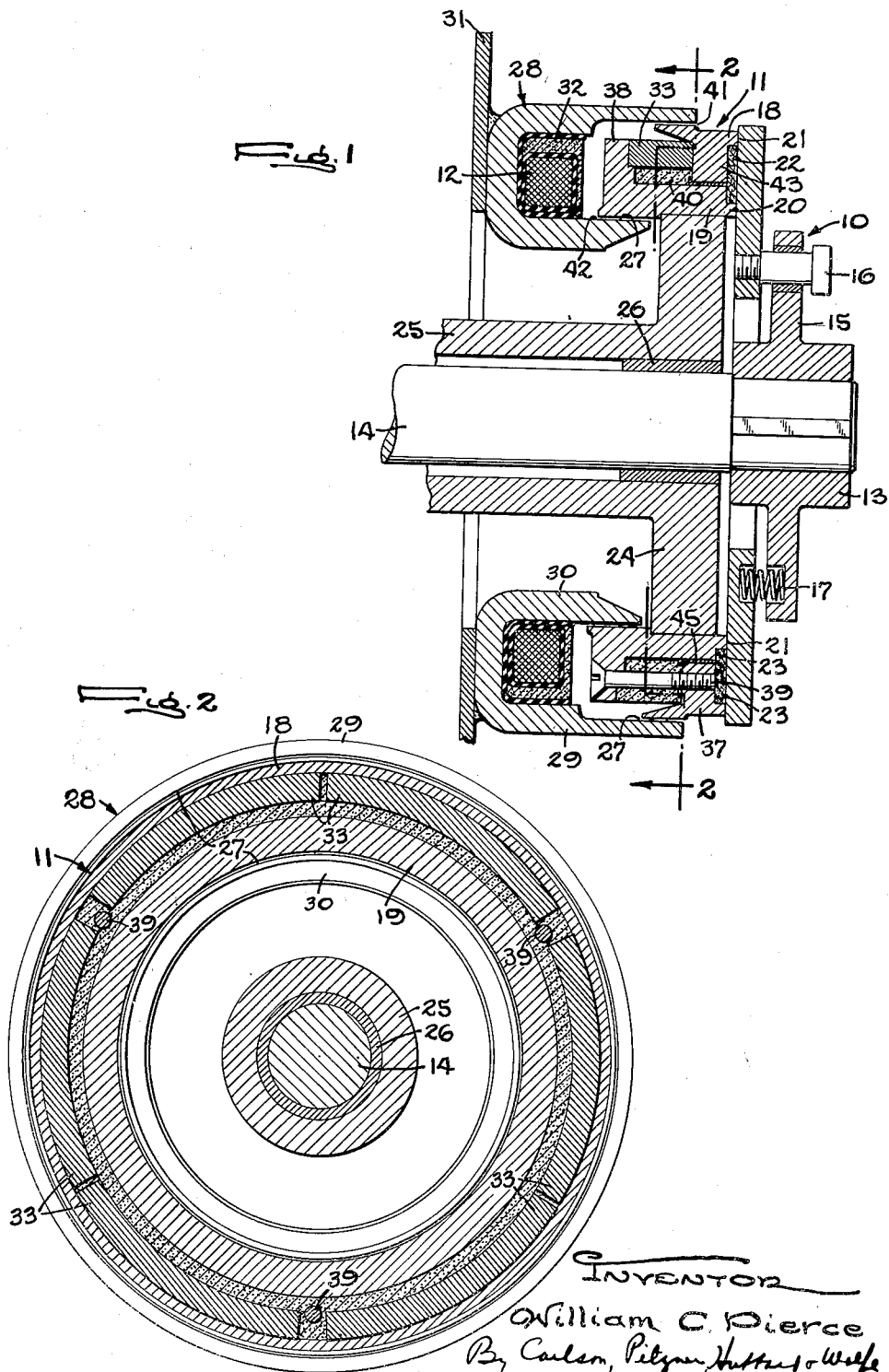
INVENTOR
William C. Pierce
By Carlson, Pitzner, Hubbard & Wolfe
ATTORNEY Sept. 25, 1962 W. C. PIERCE 3,055,470
MAGNETIC CLUTCH WITH STATIONARY WINDING
Filed July 17, 1959 5 Sheets-Sheet 2
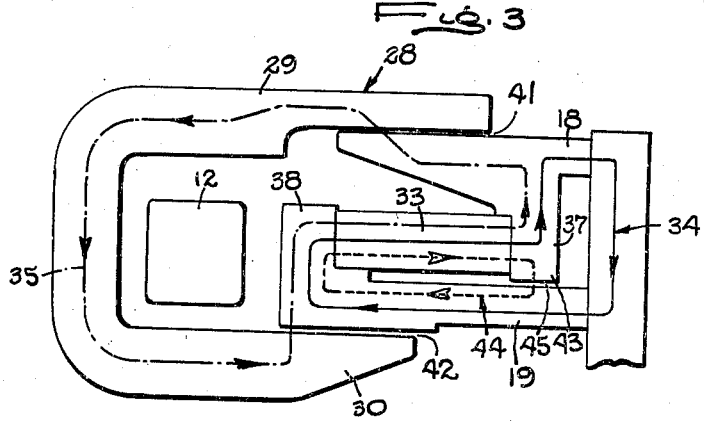
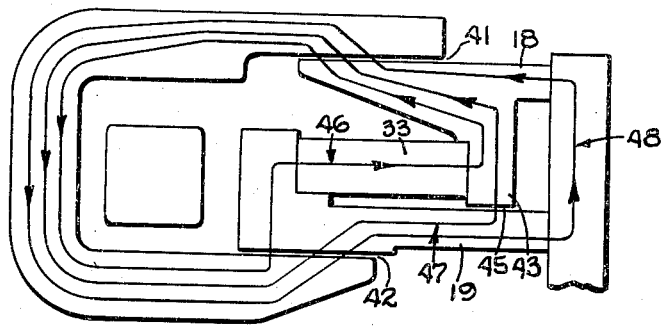
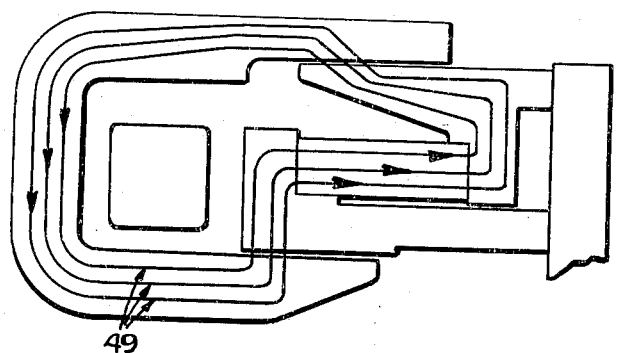
INVENTOR
William C. Pierce
By Carlson, Pitzner, Hubbard Wolfe
ATTORNEYS

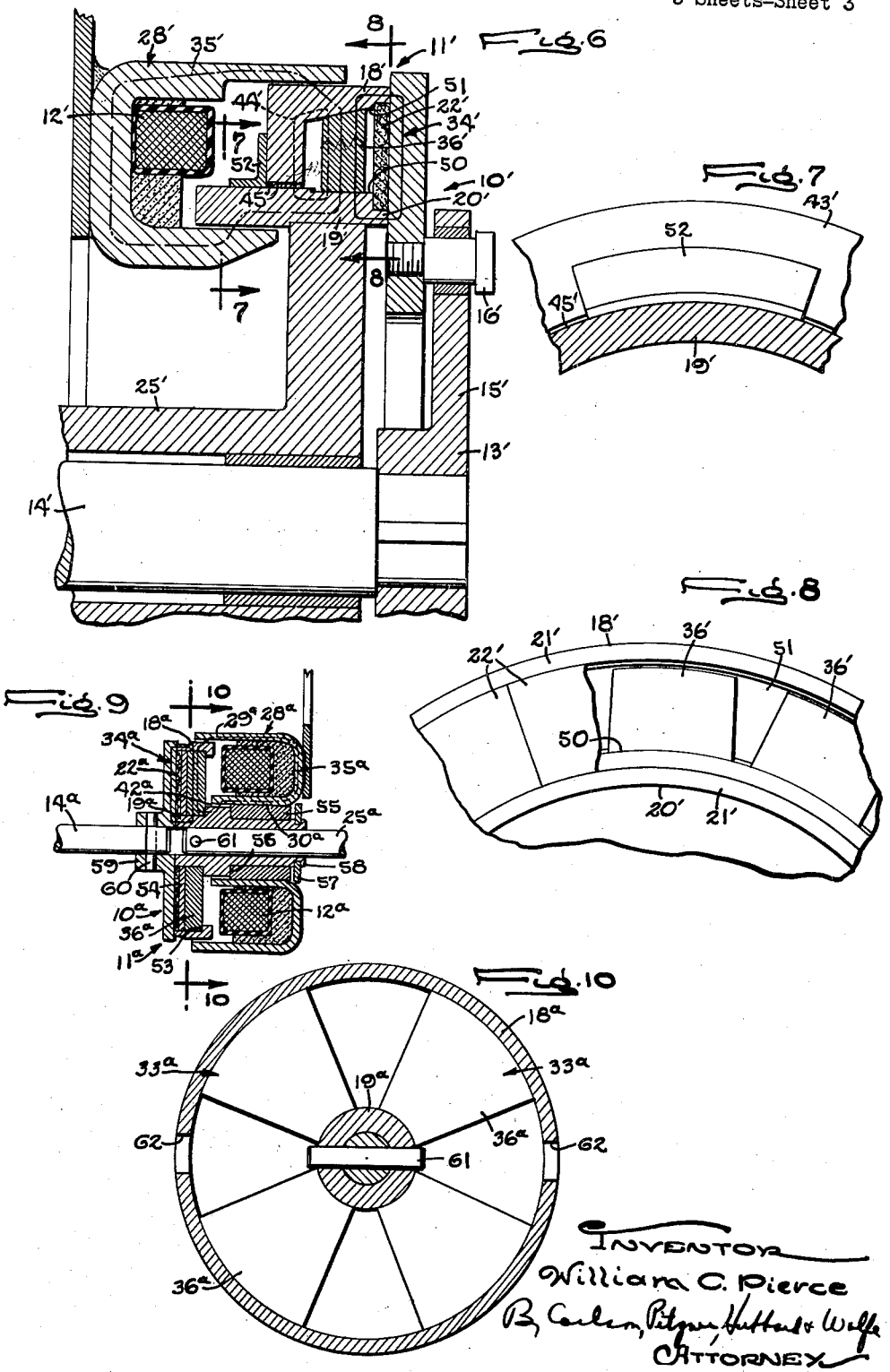

Sept. 25, 1962            W. C. PIERCE            3,055,470
MAGNETIC CLUTCH WITH STATIONARY WINDING
Filed July 17, 1959            5 Sheets-Sheet 4
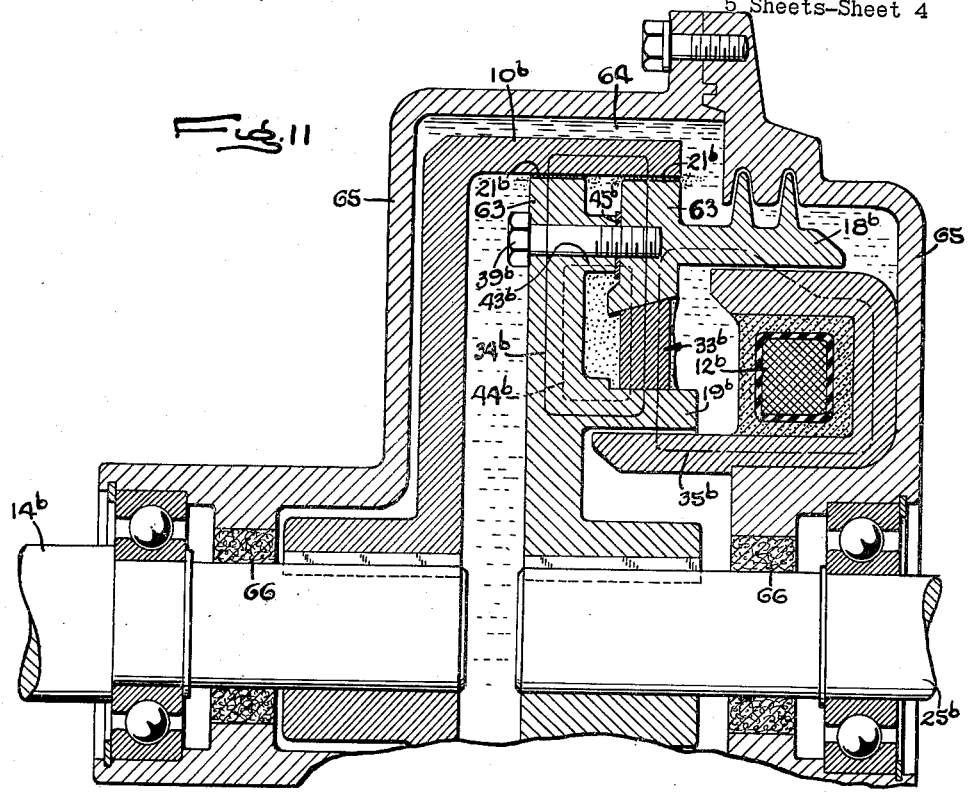
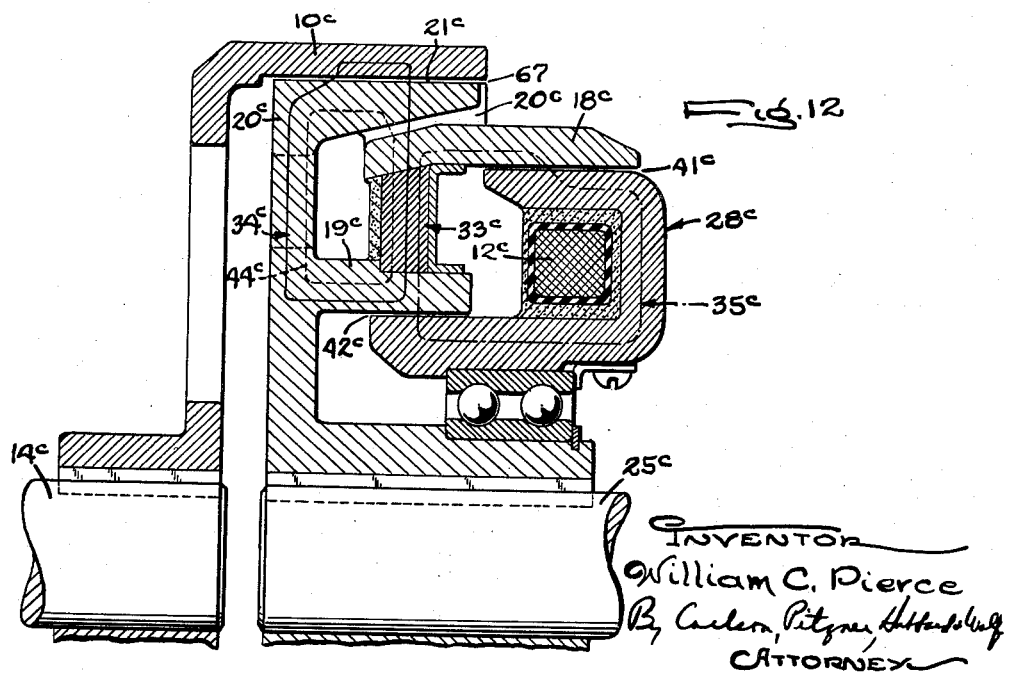
INVENTOR
William C. Pierce
By Carlson, Pitzner, Hubbard & Wolf
ATTORNEYS

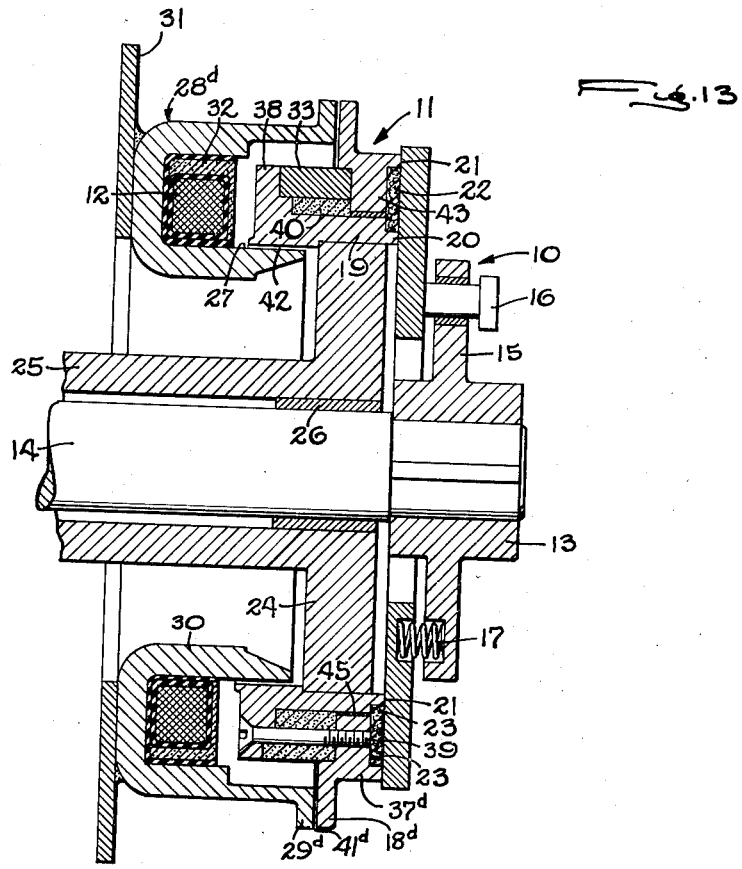

3,055,470
MAGNETIC CLUTCH WITH STATIONARY WINDING
William C. Pierce, Beloit, Wis., assignor to Warner Electric Brake & Clutch Company, South Beloit, Ill., a corporation of Illinois
Filed July 17, 1959, Ser. No. 827,953
12 Claims. (Cl. 192—21.5)

This invention relates to a magnetic clutch of the type in which the active flux for coupling the driving and driven elements together is derived from a permanent magnet and the elements are released upon energization of a winding arranged to divert the permanent magnet flux away from a main flux circuit through the elements and into an auxiliary circuit by-passing one of the elements.

The primary object of the invention is to provide a clutch of the above character having a stationarily mounted winding and fixed and rotatable parts arranged in a novel manner to achieve optimum efficiency in the use of the permanent magnet material.

Another object is to locate the permanent magnet in a novel manner to shorten the main flux circuit and utilize running air gaps between the fixed and rotatable parts as magnetic restrictions for increasing the reluctance of the auxiliary circuit and thereby causing the major portion of the permanent magnet flux to thread the main circuit.

A further object is to locate the permanent magnet on a rotary part which is constructed in a novel manner to facilitate magnetization of the magnet before assembly of the clutch parts and to retain such magnetization during assembly and disassembly of the parts.

The invention also resides in the novel arrangement of the fixed and rotatable parts to facilitate low cost production of the clutch and minimize the overall radial dimension thereof.

Other objects and advantages of the invention will become apparent from the following detailed description taken in connection with the accompanying drawings, in which FIGURE 1 is a diametrical cross section of a preferred clutch embodying the novel features of the present invention.

FIG. 2 is a sectional view taken along the line 2—2 of FIG. 1.

FIGS. 3, 4 and 5 are diagrammatic views showing the flux distribution in the magnetic parts under different conditions.

FIG. 6 is a fragmentary diametrical cross sectional view of a modified clutch.

FIGS. 7 and 8 are fragmentary sectional views taken along the lines 7—7 and 8—8 respectively of FIG. 6.

FIG. 9 is a diametrical sectional view of a further modification.

FIG. 10 is a fragmentary sectional view taken along the line 10—10 of FIG. 9.

FIGS. 11 and 12 are views similar to FIG. 6 of additional modified forms of the improved clutch.

FIG. 13 is a view similar to FIG. 1 showing a modified arrangement of the pole faces.

While the invention is susceptible of various modifications and alternative constructions, I have shown in the drawings and will herein describe in detail the preferred embodiments. It is to be understood, however, that I do not intend to limit the invention by such disclosure but aim to cover all modifications and alternative constructions falling within the spirit and scope of the invention as expressed in the appended claims.

The invention is shown in the drawings for purposes of illustration embodied in a magnetic clutch having driving and driven elements 10 and 11 mounted on coaxial shafts 14 and 25 for rotation about the common axis thereof and adapted to be coupled together by magnetic flux threading back and forth between the elements and controlled by energization and deenergization of a stationarily mounted winding 12 encircling the axis. One element 11 is the rotary part of the clutch magnet and comprises spaced rings 18 and 19 of magnetic material secured rigidly together and each telescoping closely, in the form shown in FIG. 1, with a different one of two cylindrical surfaces 27 concentric with the clutch axis and formed on a magnetic stator ring or shell 28 supporting the winding between the surfaces. The other clutch element 10 is the magnet armature or inductor ring which opposes and bridges spaced pole faces 21 facing outwardly from the rotor rings 18 and 19.

Magnetic flux for coupling the clutch elements together is derived from a permanent magnet 33 which cooperates with the rotor and stator rings 18, 19 and 28 to define two parallel flux paths of toroidal shape each extending through the permanent magnet from one pole thereof to the other. The main one of these paths is for working flux and extends from the poles of the permanent magnet and through the pole faces 21 and the armature 10 as indicated by a solid line 34 in FIG. 3. The other or auxiliary path indicated by a dot-dash line 35 in FIG. 3 extends from the magnet poles around the winding 12 and through the stator ring 28 and is utilized for diversion of the permanent magnet flux away from the main path through the pole faces when the winding is energized. A major portion of the permanent magnet flux is caused to thread the main path 34 for coupling the armature to the rotor 11 upon deenergization of the winding by making the reluctance of this path substantially lower than that of the auxiliary path 35.

To utilize the expensive permanent magnet material efficiently for providing the desired amount of permanent magnet flux in the main path 34 and to simplify the construction of the stator 28, the present invention contemplates location of the permanent magnet 33 on the rotor 11 in a connection between the rings 18 and 19 thereof. With this arrangement, air gaps 41 and 42 between the closely telescoping surfaces of the rotor rings and the stator are disposed in the auxiliary flux path 35 where they constitute magnetic restrictions increasing the reluctance of the auxiliary path over the main path. Also, the poles of the permanent magnet are arranged close to the pole faces 21 so that the main path through these faces is short and its reluctance is correspondingly low resulting in a high value of working flux for a given amount of permanent magnet material.

In the preferred form of improved clutch shown in FIGS. 1 to 5, the stator ring 28 is of U-shaped radial cross section with the winding 12 seated in a suitable cement 32 between radially spaced legs 29 and 30 thereof and with the opposed inner and outer peripheries of the legs constituting the cylindrical surfaces 27. A plate 31 welded to the closed end of the U is anchored to a suitable stationary part (not shown) to support the ring in axial alinement with the rotor 11. The rings 18 and 19 of the latter are of axially elongated tubular shape and, at one of their ends, provide radially spaced annular pole pieces 20 terminating in the pole faces 21 which face axially toward the armature 10 for frictional gripping engagement therewith. Segments 22 of nonmagnetic wear resistant material having outer surfaces flush with the pole faces are secured between the pole pieces and are backed by shoulders 23 on the rings 18 and 19. At their other end portions remote from the pole faces, the rings are straddled by the telescope with the cylindrical stator surfaces 27.

While the permanent magnet 33 may be formed as a continuous ring, it is shown herein as an interrupted ring defined by a plurality of bars angularly spaced around the rotor 11 between the rings 18 and 19 and abutting the latter. Where, as in the preferred clutch, radial compactness is desired, the bars are elongated axially and are of arcuate cross section with flat axially facing ends abutting opposed inner faces of an inturned flange 37 on the outer ring 18 and an outturned flange 38 on the inner ring 19. To secure the bars to the rings and the latter to each other, angularly spaced nonmagnetic screws 39 extend axially through countersunk apertures in the outturned flange 38 and between adjacent magnet bars and are threaded into the inturned flange 37 of the outer ring. After the parts are thus secured together, the space surrounding the magnet bars within the rings is filled with a suitable hardened cement 40. To support the rotor 11 for rotation, the shaft 25 therefor is formed as a hollow sleeve journaled on a bearing 26 on the other shaft 14 and having an outturned flange 24 pressed into the inner periphery of the inner rotor ring 19.

The armature 10 of the preferred clutch in this instance comprises a flat ring of magnetic material radially spanning the pole faces 21 and having angularly spaced pins 16 projecting rigidly therefrom and slidably received in apertures formed in an outturned flange 15 on a collar 13 keyed to the inner shaft 14. Springs 17 acting between the flange and the armature yieldably urge the latter into light running contact with the composite friction face defined by the pole faces and the wear segments 22.

In the preferred clutch as described thus far, the connection formed by the permanent magnet bars 33 and the parts of the flanges 37 and 38 disposed between the ends of the bars and the respective supporting rings 18 and 19 is common to both of the toroidal flux paths 34 and 35. The main path thus extends from the inturned flange axially through the outer pole piece 18 and its face 21, radially through the armature 10, and axially through the inner ring 19 to the outturned flange 38. The auxiliary path 35 extends from the inturned flange 37 axially through the outer pole ring 18, radially across the air gap 41 between this ring and the outer shell leg 29, around the closed end of the shell, radially across the air gap 42 between the inner leg 30 and the inner pole ring 19, and through the latter to the outturned flange 38.

To enable the permanent magnet 33 to be located on the rotor 11 and still retain its full magnetization even when the pole unit is disassembled from the armature 10 and the stator 28, the rotor includes a magnetic member 43 which cooperates with at least one of the pole rings 18 and 19 to define a keeper flux path 44 extending through the magnet in parallel with the main the auxiliary paths 34 and 35 but located entirely on the rotor as shown by the dotted line in FIG. 3. In the present instance, this member 43 is the inner peripheral portion of the inturned flange 37 which projects inwardly beyond the permanent magnet bars 33 but short of the inner rotary pole ring 19 to form a gap which is filled by a nonmagnetic ring 45. The keeper path then extends from one end of the magnet radially and inwardly through the magnetic member 43 and across the keeper gap 45, axially through the inner pole ring 19, and outwardly through the outturned flange 38 to the other end of the magnet. The gap 45 constitutes a magnetic restriction in the keeper path and is wide enough that the reluctance of this path is substantially higher than the reluctances of each of the main path and the auxiliary path. In one clutch constructed as described above, the reluctances of the three flux paths were proportioned to cause a distribution of the permanent magnet flux approximately as follows: 62 percent in the main path 34, 25 percent in the auxiliary path 35 and 13 percent in the keeper path 44.

In the operation of the preferred clutch, the flux of the permanent magnet 33 divides between its three paths as indicated by the lines 34, 35 and 44 (FIG. 3) in inverse proportion to the reluctance of the paths when the winding 12 is deenergized, the arrowheads indicating direction. The reluctance of the main path 34 being lower than that of the other paths, the major portion of the permanent magnet flux is caused to thread the main path to draw the armature 10 into gripping engagement with the pole faces 21 to couple the shaft 14 and 25 together.

When the winding 12 is energized, the flux produced thereby would tend to thread the magnetic parts as indicated in FIG. 4 assuming, for purposes of illustration, that no permanent magnet flux is present. Under this condition, all of the coil flux threads the U-shaped stator ring 28 in the same direction as the permanent magnet flux in the auxiliary path 35 indicated in FIG. 3. After crossing the inner air gap 42, the coil flux tends to divide between paths through the permanent magnet 33, the armature 10, and the keeper member 43. In the magnet, the direction of the flux indicated by an arrowed line 46 is the same as that of the magnet flux indicated in FIG. 3. In the keeper member 43 and the armature 10 as indicated by lines 47 and 48 in FIG. 4, the direction of the coil flux is opposite to that of the permanent magnet flux indicated by the lines 44 and 35 in FIG. 3. When the magnetomotive force resulting from energization of the coil is equal approximately to the magnetomotive force of the permanent magnet and the coil and permanent magnet flux are combined as shown in FIG. 5, the permanent magnet flux and the coil flux tend to thread the armature in opposite directions and therefore neutralize each other at the pole faces 21. This causes substantially all of the flux to thread the auxiliary path 35 as indicated.

As in the preferred construction of FIGS. 1 to 5, the pole faces of the modified form of the improved clutch of FIGS. 6 to 8 and that of FIGS. 9 and 10 face axially toward and are adapted for frictional gripping engagement with the armature, the parts of the modified forms corresponding to those of the preferred form bearing the same reference characters which are primed in FIGS. 6 to 8 and include the letter $a$ in FIGS. 9 and 10. The ends of the permanent magnet bars 36' of the first modification of FIGS. 6 to 8 are in direct radial abutment with an outer cylindrical surface 50 on the inner pole ring 19' and a conical inwardly facing surface 51 on the outer pole ring 18', the latter surface flaring outwardly toward the pole faces 21' to receive the bars which are wedged between the opposed surfaces. To form the keeper path indicated by the dashed line 44', the magnetic member 43' in this modified construction is a flange projecting inwardly from the end of the outer pole ring 18' remote from the pole faces and extending short of the inner pole ring 19' to define the keeper gap which, as in the preferred construction is filled with a nonmagnetic spacer ring 45'. With this arrangement, the keeper path extends through both pole rings. To secure the latter together, the legs of a plurality of nonmagnetic clips 52 of L-shaped cross section are welded to adjacent portions of the inner pole ring 19' and the keeper member 43'.

The operation of the modification of FIGS. 6 to 8 is similar to that of the preferred construction with the permanent magnet flux dividing among the three paths 34', 35' and 44' upon deenergization of the winding 12'. The magnetomotive force produced by energization of the winding opposes that of the permanent magnet in the keeper and main paths 44' and 34' to divert substantially all of the permanent magnet flux into the auxiliary path 35' and reduce the attractive force between the armature 10' and the rotor 11' substantially to zero.

In the second modification of FIGS. 9 and 10, the radially disposed permanent magnet bars $36^a$ are pressed between opposed cylindrical surfaces and against shoulders 53 on the pole rings $18^a$ and $19^a$ with a nonmagnetic spacer ring 54 backing the wear segments $22^a$. The inner pole ring $19^a$ telescopes closely within the inner end portion of the inner shell leg $30^a$ to define the inner running gap $42^a$ and is of reduced diameter axially beyond the gap for rotatably receiving a bearing ring 55 which is pressed into the inner shell leg. To utilize the auxiliary flux path 35ᵃ as a keeper circuit for the permanent magnet 36ᵃ when the armature 10ᵃ is disassembled from the pole unit 11ᵃ, the bearing 55 and thereby the stator 28ᵃ are retained on the inner pole ring 19ᵃ between a shoulder 56 thereon and a thrust ring 57 which is held on the pole ring by upsetting the end of the latter as indicated at 58. The armature 10ᵃ is formed as an outturned flange on a collar 39 which is secured to one shaft 14ᵃ by a pin 60 extending radially through the two. A similar pin 61 secures the inner pole ring to the other shaft 25ᵃ, slots 62 (FIG. 10) being formed in the outer shell leg 29ᵃ and the outer pole ring 18ᵃ for insertion of the pin after assembly of the shell on the rotor. Except for division of the permanent magnet flux between only two paths, the operation of this modification is similar to that of the other constructions with the winding 12ᵃ operating when energized to divert the permanent magnet flux away from the main path 34ᵃ through the armature and into the auxiliary path 35ᵃ around the shell.

The modified constructions of FIGS. 11 and 12 are characterized by spacing of the armature from the pole faces which face radially and outwardly from the rotor rings. In FIG. 11, the clutch is of the magnetic fluid type with cylindrical outer peripheries of two axially spaced outturned flanges 63 on the pole rings 18ᵇ and 19ᵇ constituting the pole faces 21ᵇ and with the armature 10ᵇ in the form of a cylinder encircling and axially overlapping the pole faces but spaced radially therefrom. The intervening space between the armature and the pole faces is filled with a suitable flowable mixture 64 such as oil and fine particles of magnetic material, for example, iron filings, adapted to be thickened or solidified to couple the armature to the pole pieces by magnetic flux threading the working path 34ᵇ which extends from the poles of the permanent magnet 33ᵇ through the flanges 63 and radially back and forth between the armature and the pole faces. The keeper path 44ᵇ extends between the flanges through a cylindrical ring 43ᵇ projecting radially from one flange and a thin nonmagnetic ring 45ᵇ which is clamped against the other flange by bolts 39ᵇ securing the flanges and thereby the rings together. As in the preferred construction, energization of the winding 12ᵇ results in diversion of the permanent magnet flux from the working and keeper paths and into the auxiliary path 35ᵇ. To retain the magnetic fluid 64, the clutch parts are enclosed by a stationary nonmagnetic housing 65 with seals 66 blocking fluid flow between the housing and the shafts 14ᵇ and 25ᵇ. In the modified construction of FIG. 12 which is adapted for operation either as an eddy current clutch or as a so-called hysteresis clutch, each of the pole pieces 20ᶜ is formed as a plurality of circumferentially spaced elongated bars integral with and projecting axially from the associated one of the rotor rings 18ᶜ and 19ᶜ and each extending between and overlapping axially with adjacent bars on the other rotor ring. Encircling and radially spaced from the pole faces 21ᶜ on the bars by a narrow running gap 67 is the armature or inductor ring 10ᶜ which is cylindrical as in the magnetic fluid clutch of FIG. 11. With this arrangement, the working flux circuit 34ᶜ extends from one pole of the permanent magnet 33ᶜ through the adjacent rotor ring and its pole piece bars, radially across the running gap 67, circumferentially through the armature, radially back across the gap, and through the other pole piece bars and the other rotor ring to the other pole of the magnet. The keeper circuit 44ᶜ also extends circumferentially between the pole piece bars, the circumferential spacing of the latter being sufficiently greater than that of the running gap 67 between the pole faces and the armature or that of the air gaps 41ᶜ and 42ᶜ between the rotor and the stator 28ᶜ that the keeper circuit is higher in reluctance than either of the main and auxiliary circuits 34ᶜ and 35ᶜ. Where eddy current operation is desired, the armature is formed of a suitable electrically conductive material, a permanent magnet material with high retentive properties being used where a hysteresis clutch is desired.

While the gaps 41, 42 for transferring the magnetic flux between the pole pieces 29, 30 of the stationary core 28 and the pole rings 18 and 19 of the rotor 11 are disposed radially in FIG. 1, it will be apparent that one or both of these gaps may extend axially. Such a modification is shown in FIG. 13 in which parts in common with FIG. 1 bear the same reference numerals. In this instance, the outer one of the air gaps indicated at 41ᵈ is defined by outturned flanges 18ᵈ and 29ᵈ on the rotating and stationary pole pieces 37ᵈ and 28ᵈ. Thus, the main flux path extends axially between the opposed faces of the two flanges instead of radially as in FIG. 1. If desired, the inner pole pieces 19 and 30 may be similarly flanged to extend the inner air gap 42 axially instead of radially.

It will be apparent that the location of the permanent magnet 33 on the rotor 11 of each of the above constructions makes it possible to shorten the length of the main path 34 for the permanent magnet flux so that a small amount of permanent magnet material provides the desired attractive force between the rotor and the armature 10. Also, the running air gaps 41 and 42 between the stator and the rotor are disposed in the auxiliary path 35 and constitute magnetic restrictions raising the reluctance of this path sufficiently higher than that of the main path to cause the major portion of the permanent magnet flux to thread the main path as useful flux for producing torque. With the gaps utilized as restrictions, the stationary shell may be formed easily in one piece as by a stamping operation. Location of the permanent magnet on the rotor is made possible through the provision of the keeper circuit 44 which enables the permanent magnet to be magnetized before assembly of the rotor and the stator and insures that the magnetism will be retained during disassembly of the rotor from the armature and the stator. Due to the higher reluctance of this path as compared to both of the main and auxiliary paths, little permanent magnet flux is lost therein and the effectiveness of the winding 12 in controlling the flux at the pole faces is high.

This application is a continuation-in-part of my copending application Serial No. 609,203 filed September 11, 1956, now abandoned.

I claim as my invention:

1. A magnetic clutch having, in combination, a nonrotatable stator comprising a magnetic annulus having radially spaced pole surfaces concentric with the axis of the annulus, a multiple turn winding mounted on said stator between said surfaces, a rotor mounted to turn about said axis and comprising concentric rings disposed opposite the respective stator surfaces to define intervening gaps of narrow width, said rings terminating in axially facing pole faces each having a flange projecting radially therefrom and toward the other ring and spaced axially from the other flange, a permanent magnet extending longitudinally of said axis between said rings and having flat ends abutting said flanges, means securing said magnet and said rings together to form a rigid unit, one of said flanges extending short of the ring supporting the other flange to cooperate with the ring to define a keeper circuit on said rotor for said permanent magnet, and an armature rotatable about said axis and spanning said pole faces for axial gripping engagement therewith, said armature, said rings and said magnet cooperating to define a substantially closed main flux path of toroidal shape and said stator cooperating with the magnet and the rings to define a second toroidal flux path threading said gaps and by-passing said armature.

2. In a magnetic clutch, the combination of, a nonrotatable stator comprising a magnetic annulus providing pole surfaces concentric with the axis of the stator and radially spaced apart, a multiple turn winding mounted on and disposed within said stator, a rotor mounted to turn about said axis and comprising rings of magnetic material secured rigidly together and having surfaces opposing and generally similar to the pole surfaces on said stator, means supporting said rings adjacent to but spaced from the pole surfaces on said stator to define intervening air gaps of narrow width, said rings providing spaced pole faces facing outwardly away from said rotor, an armature mounted to rotate about said axis and bridging said pole faces, a permanent magnet rigid with and completing a magnetic connection between said rings, and a magnetic member rigid with one of said rings and spaced from the other ring by a narrow nonmagnetic gap, said annulus, said rings, said magnet, said armature, and said member cooperating to define three parallel flux paths of toroidal shape each extending through the permanent magnet from one pole thereof to the other, a main path extending through said pole faces and the armature and having a substantially lower reluctance than each of the other paths, an axiliary path extending across said gaps and around said annulus and by-passing said pole faces and armature, and a keeper path extending through at least one of said pole legs and across said nonmagnetic gap and having a higher reluctance than said auxiliary path.

3. A magnetic clutch having, in combination, a nonrotatable stator comprising a magnetic annulus of U-shaped cross-section having concentric pole projections, a multiple turn winding on said stator between said projections, a rotor mounted to turn about the axis of said stator and comprising concentric rings of magnetic material having surfaces disposed opposite surfaces on the respective pole projections to define intervening gaps of narrow width, said rings terminating in axially facing pole faces, an armature rotatable about said axis and spanning said pole faces for axial gripping engagement therewith, a permanent magnet mounted on said rotor between said rings and having ends of opposite polarity abutting the respective rings to form therewith and said armature a substantially closed main flux path of toroidal shape, said stator, said rings and said magnet coacting to form a second toroidal flux path threading said gaps, and a magnetic member on one of said rings extending toward but short of the other ring to form a third air gap and coacting with the other ring and said magnet to form a third toroidal flux path threading the gap to avoid demagnetization of the magnet upon disassembly of said rotor from said stator and said armature.

4. A magnetic clutch having in combination, a nonrotatable stator comprising a magnetic annulus of U-shaped radial cross-section having concentric pole projections, a multiple turn winding on said stator between said projections, a rotor mounted to turn about the axis of said stator and comprising concentric rings of magnetic material having surfaces opposing the respective pole projections to define intervening air gaps of narrow width, said rings terminating in axially facing pole faces, an armature rotatable about said axis and spanning said pole faces for axial gripping engagement therewith, and a permanent magnet mounted on said rotor between said rings and having ends of opposite polarity abutting the respective rings to form therewith and said armature a substantially closed main flux path of toroidal shape, said stator, said rings and said magnet coacting to form a second toroidal flux path extending away from said armature through said air gaps and around said annulus and having a reluctance sufficiently higher than said main path to cause the major portion of the permanent magnet flux to thread the main path.

5. A magnetic clutch having in combination, a nonrotatable stator comprising a magnetic annulus providing radially spaced surfaces concentric with the axis of the stator, a multiple turn winding on said stator between said surfaces, a rotor mounted to turn about said axis and comprising elongated tubular rings of magnetic material having surfaces disposed opposite the respective ones of said surfaces to define intervening gaps of narrow width, said rings terminating in axially facing pole faces, an armature rotatable about said axis and spanning said pole faces for axial gripping engagement therewith, and a permanent magnet angularly spaced around said rotor between said rings and having ends of opposite polarity abutting the respective rings to form therewith and said armature a substantially closed main flux path of toroidal shape extending through said pole faces and said armature, said stator, said rings and said magnet coacting to form a second toroidal flux path extending away from said armature through said gaps and around the stator and said winding and having a reluctance sufficiently higher than said main path to cause the major portion of the permanent magnet flux to thread the main path.

6. In a magnetic clutch, the combination of, a nonrotatable stator comprising a magnetic annulus providing pole surfaces concentric with the axis of the stator and radially spaced apart, a rotor mounted to turn about said axis and comprising rings of magnetic material secured rigidly together and having surfaces opposing and generally similar to the pole surfaces on said stator, means supporting said rings adjacent to but spaced from the pole surfaces on said stator to define intervening air gaps of narrow width, said rings providing spaced pole faces facing outwardly away from said rotor, an armature ring mounted to rotate about said axis and bridging said pole faces, a permanent magnet abutting opposed parts of said rings and completing a magnetic connection bridging the rings and cooperating with the latter and said annulus to define a working flux path of toroidal shape extending through said pole faces and the permanent magnet from one pole thereof to the other and a parallel flux path of toroidal shape extending from the permanent magnet poles across said air gaps and around said annulus, said rotor cooperating with said permanent magnet to complete a keeper flux path of toroidal shape extending through said permanent magnet and disposed wholly within said rotor, and an annular winding seated on said annulus between said surfaces and operable when energized to produce a flux correlated with said magnet flux in direction and amount to divert substantially all of the permanent magnet flux into said parallel flux path and away from said keeper and working paths, said keeper and parallel paths each having a reluctance sufficiently higher than said working path to cause the major portion of said permanent magnet flux to thread the working path.

7. The clutch defined in claim 6 in which said pole faces are cylindrical surfaces axially spaced apart and facing radially from said rings, said armature is of cylindrical shape encircling and axially spanning the pole faces but spaced radially therefrom by a narrow gap, and said gap between the armature and the pole faces is filled with a flowable magnetic mixture.

8. The clutch defined in claim 6 in which said pole faces face radially from said rings and are formed on an annular series of circumferentially spaced pole pieces secured to and projecting axially from the respective rings with alternating pieces secured to one ring and overlapping with the intervening pieces on the other ring and said armature is formed as a cylinder circumferentially bridging the pole faces and spaced radially therefrom by a narrow radial running gap.

9. A magnetic clutch having in combination, a nonrotatable stator comprising a magnetic annulus providing pole surfaces concentric with the axis of the stator and radially spaced apart, a multiple turn winding mounted on and disposed within said stator, a rotor mounted to turn about said axis and comprising rings of magnetic material secured rigidly together and having surfaces opposing and generally similar to the pole surfaces on said stator, means supporting said rings adjacent to but spaced from the pole surfaces on said stator to define intervening air gaps of narrow width, said rings providing spaced pole faces facing outwardly away from said rotor, an armature rotatable about said axis and bridging said pole faces, means cooperating with said armature and pole pieces for transmitting torque therebetween during threading of flux therethrough, a permanent magnet mounted on said rotor between said rings and having ends of opposite polarity abutting the respective rings to form therewith a main flux path extending through said pole faces and by-passing said air gaps; said stator, said rings and said magnet coacting to form a second flux path of toroidal shape extending away from said pole faces through said gaps and around the stator and said winding and having a reluctance sufficiently higher than said main path to cause the major portion of the permanent magnet flux to thread the main path.

10. The clutch defined in claim 9 in which said pole faces are annular surfaces radially spaced apart and facing axially away from said rotor and said armature bridges the pole faces radially and is adapted for frictional gripping engagement therewith.

11. The clutch defined in claim 9 in which said pole faces are cylindrical surfaces axially spaced apart and facing radially from said rings, said armature is of cylindrical shape encircling and axially spanning the pole faces but spaced radially therefrom by a narrow gap, and said gap between the armature and the pole faces is filled with a flowable magnetic mixture.

12. The clutch defined in claim 9 in which said pole faces face radially from said rings and are formed on an annular series of circumferentially spaced pole pieces secured to and projecting axially from the respective rings with alternating pieces secured to one ring and overlapping with the intervening pieces on the other ring and said armature is formed as a cylinder circumferentially bridging the pole faces and spaced radially therefrom by a narrow radial running gap.

References Cited in the file of this patent

UNITED STATES PATENTS

| | | |
|---|---|---|
| 1,622,939 | Bing | Mar. 29, 1927 |
| 2,614,668 | Waderlow | Oct. 21, 1952 |
| 2,617,507 | Feiertag | Nov. 11, 1952 |
| 2,646,145 | Durston | July 21, 1953 |
| 2,729,318 | Harter | Jan. 3, 1956 |
| 2,738,449 | Mason | Mar. 13, 1956 |
| 2,914,714 | Pierce et al. | Nov. 24, 1959 |